United States Patent
Jang et al.

(10) Patent No.: US 12,024,055 B2
(45) Date of Patent: Jul. 2, 2024

(54) BATTERY CHARGING CONTROL METHOD AND SYSTEM

(71) Applicants: Hyundai Motor Company, Seoul (KR); Kia Motors Corporation, Seoul (KR)

(72) Inventors: Young Jin Jang, Seoul (KR); Soung Han Noh, Yongin-si (KR); Jun Yeon Park, Incheon (KR); Hyung Souk Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 647 days.

(21) Appl. No.: 17/307,743

(22) Filed: May 4, 2021

(65) Prior Publication Data
US 2021/0252996 A1    Aug. 19, 2021

Related U.S. Application Data

(62) Division of application No. 15/839,487, filed on Dec. 12, 2017, now Pat. No. 11,027,625.

(30) Foreign Application Priority Data

Sep. 12, 2017  (KR) .................. 10-2017-0116352

(51) Int. Cl.
*H02J 7/00*      (2006.01)
*B60L 53/00*    (2019.01)
*B60L 58/13*    (2019.01)
*B60R 16/03*    (2006.01)
*G01C 21/36*   (2006.01)
*H02J 7/14*      (2006.01)
*G01C 21/34*   (2006.01)

(52) U.S. Cl.
CPC .............. *B60L 58/13* (2019.02); *B60L 53/00* (2019.02); *B60R 16/03* (2013.01); *G01C 21/36* (2013.01); *H02J 7/00* (2013.01); *G01C 21/3469* (2013.01)

(58) Field of Classification Search
CPC ........... B60L 58/13; B60L 53/00; B60R 16/03
USPC ......................................................... 320/104
See application file for complete search history.

(56) References Cited

U.S. PATENT DOCUMENTS 6,166,449 A    12/2000  Takaoka et al.
10,160,325 B2  12/2018  Lee et al.
(Continued)

FOREIGN PATENT DOCUMENTS

DE         60133446 T2    4/2009
DE      102016108358 A1   6/2017
(Continued)

*Primary Examiner* — Alexis B Pacheco
(74) *Attorney, Agent, or Firm* — Slater Matsil, LLP

(57) ABSTRACT

A battery charging control method includes receiving a destination input to a navigation device. When a vehicle starts, a switch is turned on to charge a battery. When a State Of Charge (SOC) of the battery becomes larger than a preconfigured value, the switch is turned off for a first time interval derived on the basis of an estimated destination arrival time derived from the navigation device. The switch is turned on again at a time point at which the first time interval has passed. The switch is turned on again to charge the battery for a second time interval.

10 Claims, 3 Drawing Sheets

(56) References Cited

U.S. PATENT DOCUMENTS

| | | | |
|---|---|---|---|
| 2009/0101421 A1* | 4/2009 | Oyobe | B60L 53/14 |
| | | | 180/65.265 |
| 2009/0121669 A1* | 5/2009 | Hanada | B60L 50/60 |
| | | | 318/504 |
| 2009/0255493 A1* | 10/2009 | Ichimoto | B60L 1/003 |
| | | | 123/90.11 |
| 2010/0121507 A1* | 5/2010 | Ishii | B60W 10/26 |
| | | | 701/22 |
| 2010/0318250 A1* | 12/2010 | Mitsutani | B60L 50/61 |
| | | | 320/109 |
| 2011/0101915 A1 | 5/2011 | Mitsutani | |
| 2011/0187184 A1* | 8/2011 | Ichikawa | B60L 55/00 |
| | | | 307/10.1 |
| 2012/0283902 A1 | 11/2012 | Kusumi et al. | |
| 2013/0046428 A1* | 2/2013 | Jordan | B60L 1/06 |
| | | | 701/22 |
| 2014/0167680 A1 | 6/2014 | Park | |
| 2015/0019060 A1 | 1/2015 | Suzuki | |
| 2015/0115886 A1 | 4/2015 | Loftus et al. | |
| 2016/0114786 A1* | 4/2016 | Morisaki | B60L 50/16 |
| | | | 180/65.265 |
| 2016/0236586 A1 | 8/2016 | Soo et al. | |
| 2016/0243958 A1 | 8/2016 | Miller et al. | |
| 2016/0301114 A1* | 10/2016 | Izumi | H01M 10/625 |
| 2017/0008408 A1 | 1/2017 | Park et al. | |
| 2017/0080809 A1 | 3/2017 | Lee et al. | |
| 2017/0166076 A1 | 6/2017 | Yoon et al. | |
| 2018/0273021 A1* | 9/2018 | Morimoto | B60W 10/26 |
| 2019/0375393 A1 | 12/2019 | Jang | |

FOREIGN PATENT DOCUMENTS

| | | |
|---|---|---|
| EP | 1211121 A2 | 6/2002 |
| JP | 2004236472 A | 8/2004 |
| JP | 2017114312 A | 6/2014 |
| JP | 2014172587 A | 9/2014 |
| JP | 2016025390 A | 2/2016 |
| JP | 2017093226 A | 5/2017 |
| JP | 2017104000 A | 6/2017 |
| KR | 20140078859 A | 6/2014 |
| KR | 20160150420 A | 12/2016 |
| KR | 20170006915 A | 1/2017 |
| KR | 20170033941 A | 3/2017 |
| KR | 20170070658 A | 6/2017 |
| KR | 101765641 B1 | 8/2017 |

* cited by examiner

BATTERY CHARGING CONTROL METHOD AND SYSTEM

CROSS-REFERENCE TO RELATED APPLICATIONS

This application is a divisional application of U.S. application Ser. No. 15/839,487, filed on Dec. 12, 2017, which claims priority to Korean Patent Application No. 10-2017-0116352, filed on Sep. 12, 2017, which applications are hereby incorporated herein by reference.

TECHNICAL FIELD

The present invention relates to a battery charging control method and system.

BACKGROUND

In a case of a hybrid vehicle and an electric vehicle, an electrical load and an auxiliary battery are connected in parallel to an output terminal of a Low voltage DC-DC Converter (LDC). In general, an LDC is always operated when a vehicle runs, and even if the auxiliary battery has been fully charged, the LDC charges the auxiliary battery. Accordingly, energy loss resulting therefrom causes inefficiency.

Also, maintaining an auxiliary battery to be as fully charged as possible when a vehicle stops running is ideal for preventing discharging of the auxiliary battery. However, in a conventional technology, because when the vehicle stops is unknown, an auxiliary battery is continuously charged, resulting in some energy loss. Accordingly, an LDC continuously supplies energy even when the auxiliary battery is fully charged, and thus energy loss occurs.

Therefore, a solution is needed for reducing energy loss of an LDC through control of charging an auxiliary battery, and for improving fuel economy by ensuring a vehicle has the best SOC when the vehicle stops running.

The above description in this background section is merely for improving understanding of the background of the present disclosure, and should not be taken as an acknowledgement indicating that the information forms a prior art that is already known to a person skilled in the art.

SUMMARY

The present invention relates to a battery charging control method and system. Particular embodiments relate to a battery charging control method and system, which uses navigation information to determine a time point at which a vehicle stops running. When the vehicle stops running, the system controls an auxiliary battery to be as fully charged as possible so as to prevent the battery from being discharged and prevent energy from flowing to the auxiliary battery when the auxiliary battery is fully charged, thereby maximizing fuel economy.

Embodiments of the present invention solve problems discussed above. An aspect of the present invention is to provide a battery charging control method and system, which uses navigation information to determine a time point at which a vehicle stops running. When the vehicle stops running, the system controls an auxiliary battery to be as fully charged as possible.

In accordance with an aspect, a battery charging control method includes turning on a switch when a vehicle is on, to charge a battery. When a State Of Charge (SOC) of the battery is larger than a preconfigured value, the switch is turned off for a first time interval derived on the basis of an estimated destination arrival time transmitted from the navigation device. The switch is turned on again at a time point at which the first time interval has passed, to charge the battery for a second time interval.

The turning off of the switch includes turning off the switch and adjusting output voltage of a DC-DC converter, according to magnitude of an electrical load electrically connected, together with the battery, in parallel to an output terminal of the DC-DC converter.

In the turning off of the switch, the estimated destination arrival time is a time from a time point of turning off the switch, to a time point of arrival.

The turning off of the switch further includes deriving the first time interval by using an equation, first time interval=$T*(Pchg-2Pdiff-Pload)/(Pchg-Pdiff-Pload)$, wherein T indicates the estimated destination arrival time, Pchg indicates a charging power, Pdiff indicates a discharging power, and Pload indicates a load power.

The turning off of the switch further includes deriving the second time interval by using an equation, second time interval=$T*(Pdiff)/(Pchg-Pdiff-Pload)$, wherein T indicates the estimated arrival destination time, Pchg indicates a charging power, Pdiff indicates a discharging power, and Pload indicates a load power.

A battery charging control system according to an embodiment of the present invention includes a battery, a DC-DC converter that converts a voltage level to charge the battery, and a switch connected between the DC-DC converter and the battery. A navigation device receives a destination from a user to derive an estimated destination arrival time. A control unit turns on the switch to charge the battery when a destination is input to the navigation device and a vehicle is on. When a State Of Charge (SOC) of the battery is larger than a preconfigured value, the control unit turns off the switch for a first time interval derived on the basis of an estimated destination arrival time interval transmitted from the navigation device, and turns on the switch again at a time point at which the first time interval has passed, so as to charge the battery for a second time interval.

The system further includes an electrical load electrically connected, together with the battery, in parallel to an output terminal of the DC-DC converter, wherein, when an SOC of the battery becomes larger than the preconfigured value, the control unit turns off the switch for the first time interval and adjusts output voltage of the DC-DC converter, according to magnitude of the electrical load.

The estimated destination arrival time, which the control unit receives from the navigation device, is a time from a time point of turning off the switch to a time point of arrival.

The control unit derives the first time interval by using an equation, first time interval=$T*(Pchg-2Pdiff-Pload)/(Pchg-Pdiff-Pload)$, wherein T indicates the estimated destination arrival time interval, Pchg indicates a charging power, Pdiff indicates a discharging power, and Pload indicates a load power.

The control unit derives the second time interval by using an equation, second time interval=$T*(Pdiff)/(Pchg-Pdiff-Pload)$, wherein T indicates the estimated destination arrival time interval, Pchg indicates a charging power, Pdiff indicates a discharging power, and Pload indicates a load power.

A battery charging control method and system according to an embodiment the present invention uses navigation information to determine a time point at which a vehicle stops running and, when the vehicle stops running, controls an auxiliary battery to be as fully charged as possible so as to prevent the battery from being discharged and prevent energy from flowing to the auxiliary battery when the auxiliary battery is fully charged, thereby maximizing fuel economy.

Also, the method and the system minimize consumption power of an LDC thereby minimizing the energy consumption of a main battery.

Also, the method and the system fully charge an auxiliary battery, then turn off a switch of the auxiliary battery, and allow a voltage of an electrical load to be variably controlled by a LDC, thereby improving fuel economy.

Also, the method and the system can maximally use a variable voltage control for an LDC by including a travelling time increase due to a traffic state through calculation on the basis of time.

Also, the method and the system maximally maintain a conventional variable voltage control through fully-charging control at an arrival point and maintenance of a charging limit line, so as to maintain the effect of fuel economy.

Also, the method and the system perform a fast fully-charging control, instead of increasing in a charging lower limit line, so as to minimize fuel economy loss due to overcharging of an SOC.

Also, even if an electrical load is rapidly changed at the vicinity of an arrival point, the electrical load is not affected therefrom because a relay is turned off after an auxiliary battery is fully charged. Therefore, it is possible to make an auxiliary battery be in a fully charged state upon arrival.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, a battery charging control method and system according to various embodiments of the present invention will be described with reference to the accompanying drawings.

Figure 1:
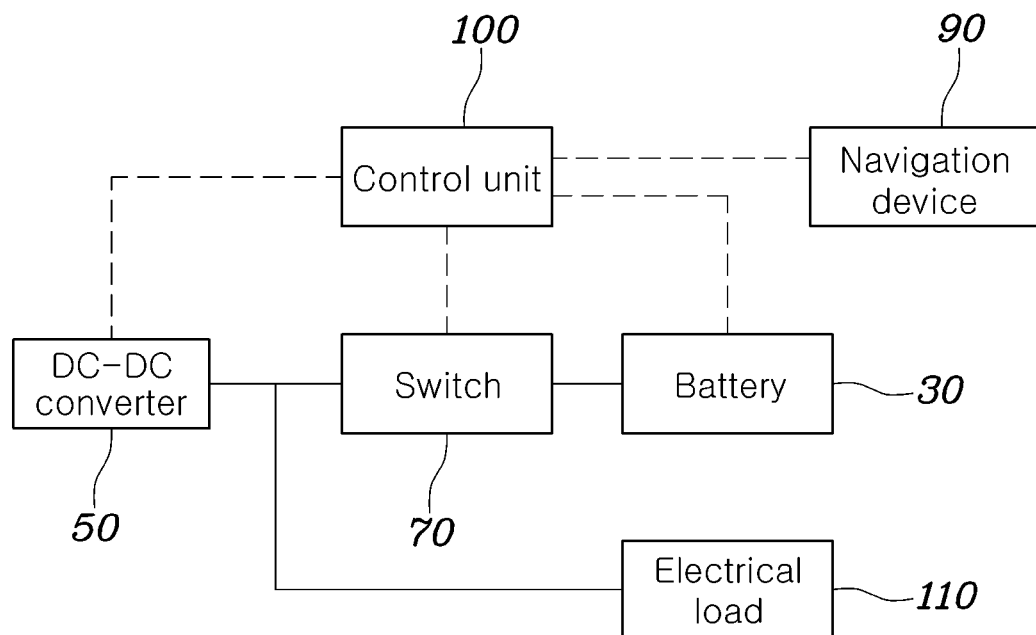
FIG. 1 is a configuration diagram of a battery charging control system according to an embodiment of the present invention.
Figure 2:
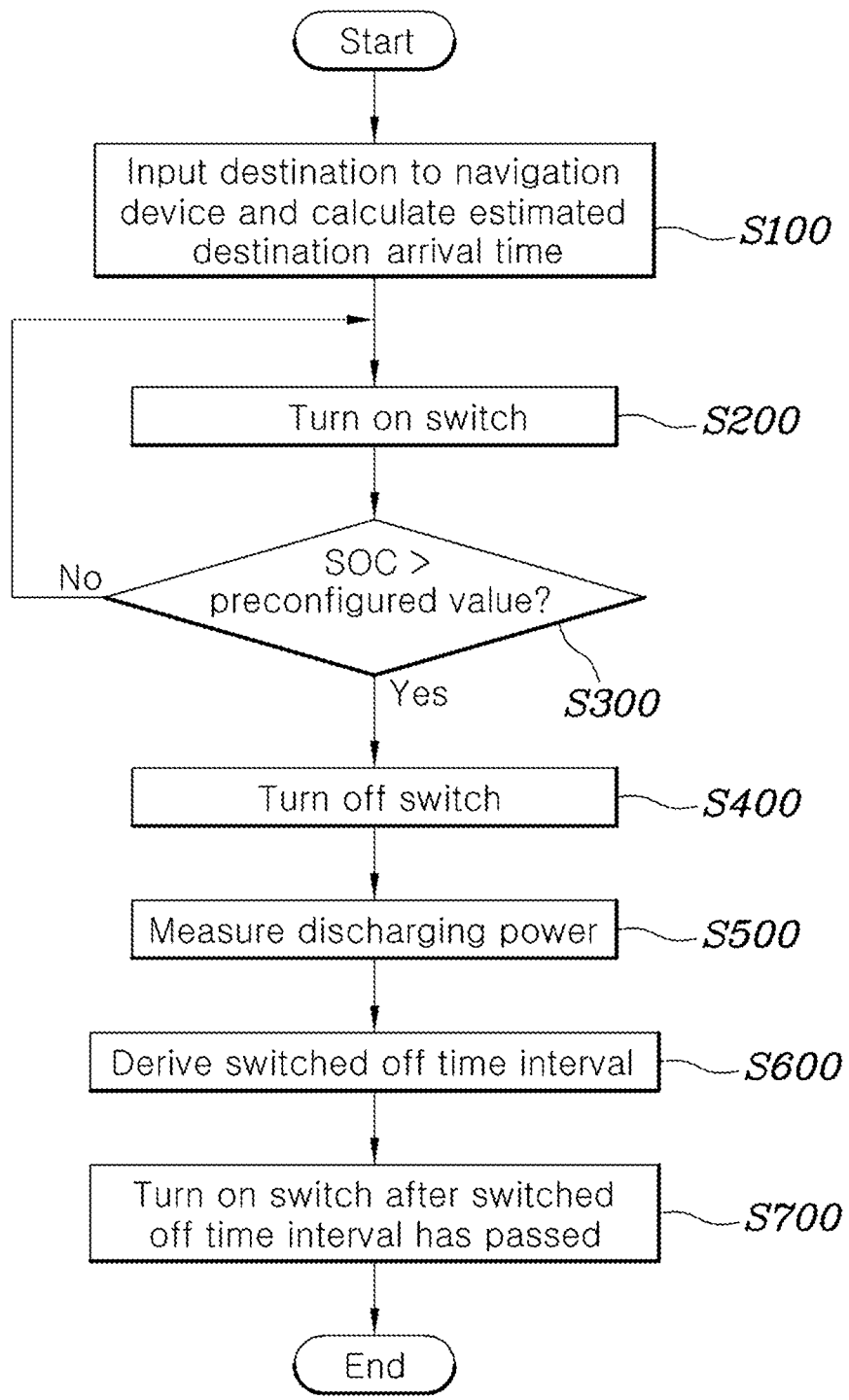
FIG. 2 is a flow chart of a battery charging control method according to an embodiment of the present invention.
Figure 3:
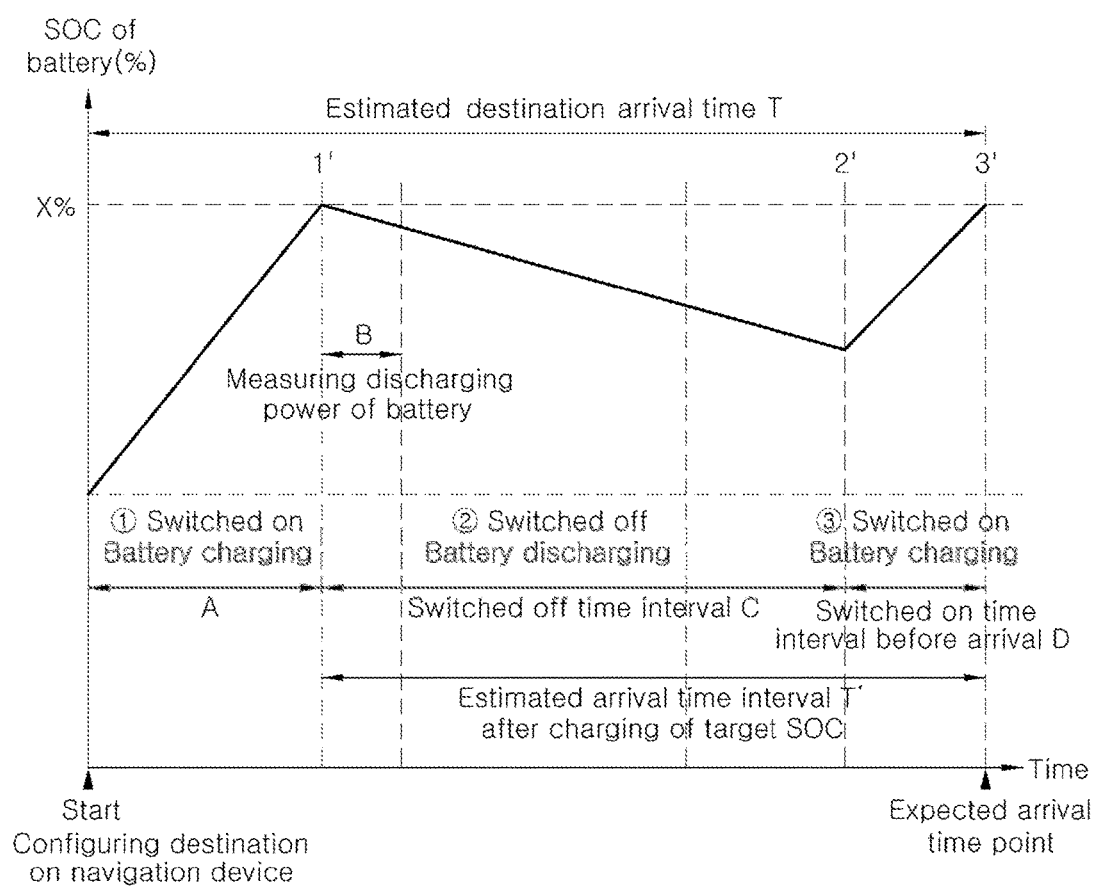
FIG. 3 is a graph for explaining a battery charging control method according to an embodiment of the present invention.

FIG. 1 is a configuration diagram of a battery charging control system according to an embodiment of the present invention, FIG. 2 is a flow chart of a battery charging control method according to an embodiment of the present invention, and FIG. 3 is a graph for explaining a battery charging control method according to an embodiment of the present invention.

First, referring to FIG. 1, a battery charging control system according to an embodiment of the present invention may include a battery 30, a DC-DC converter 50 that converts a voltage level to charge the battery 30, and a switch 70 connected between the DC-DC converter 50 and the battery 30. A navigation device 90 is configured to receive a destination from a user to derive an estimated destination arrival time. A control unit 100 is configured to turn on the switch 70 to charge the battery 30 when a destination is input to the navigation device 90 and a vehicle starts. When a State Of Charge (SOC) of the battery 30 becomes larger than a preconfigured value, the control unit 100 turns off the switch 70 for a first time interval derived on the basis of an estimated destination arrival time transmitted from the navigation device 90. The control unit 100 turns on the switch 70 again at a time point at which the first time interval has passed, so as to charge the battery 30 for a second time interval.

The battery 30 may be an auxiliary battery that receives electric power supplied from the DC-DC converter 50 and supplies the electric power to an electrical load 110, which will be described in an embodiment of the present invention.

In an embodiment of the present invention, the DC-DC converter 50 may be a Low voltage DC-DC Converter (LDC) that converts a voltage level input from a vehicular low-speed charger (On-Board battery Charger, OBC) and then outputs voltage of the converted voltage level. The DC-DC converter 50 is electrically connected to each of the battery 30 and the electrical load 110 to charge the battery 30. Further, when the switch 70 is turned off, the DC-DC converter 50 adjusts output voltage according to the magnitude of the electrical load 110 to supply the adjusted output voltage, which will be described below.

The switch 70 is connected between the DC-DC converter 50 and the battery 30, and may be a relay as an embodiment of the present invention. The switch 70 is turned on and off by the control unit 100. When the switch 70 is turned on, the battery 30 is charged. When the switch 70 is turned off, the battery 30 is blocked in electrical connection with the DC-DC converter 50 and the electrical load 110 and is thus naturally discharged.

The electrical load 110 may be electrically connected, together with the battery 30, in parallel to an output terminal of the DC-DC converter 50.

The navigation device 90 is a device for identifying a current vehicle position from a satellite for a Global Positioning System (GPS), and providing information relating to a current vehicle geographical position, information on road and traffic condition on the way to a destination, and an estimated destination arrival time, on the basis of geographical information mapped using the identified current vehicle position. According to an embodiment of the present invention, the navigation device 90 may be a navigation device mounted to a vehicle, or a mobile terminal (e.g., cellular phone and tablet device) that is connected through Bluetooth or a wire to the vehicle.

The control unit 100 can be implemented in a number of ways. For example, known hardware can be controlled using any control circuitry, for example, a microcontroller or digital logic circuitry implemented, for example, in an application specific integrated circuit (ASIC). In one example, the control unit 100 could include a processor and a non-transitory computer-readable storage medium storing a program to be executed by the processor. The program could be based on the flowchart of FIG. 2.

When the navigation device 90 receives a destination and the vehicle starts, the control unit 100 turns on the switch 70 to charge the battery 30. Then, when a State Of Charge (SOC) of the battery 30 becomes larger than a preconfigured value, the control unit 100 turns off the switch 70 during a first time interval derived on the basis of an estimated destination arrival time transmitted from the navigation device 90. Then, the control unit 100 turns on the switch 70 again at a time point at which the first time interval has passed, to charge the battery 30 during a second time interval.

The preconfigured value is an SOC preconfigured in the control unit 100, may be a value of 80-90% in an embodiment of the present invention, and may vary according to setting. The control unit 100 determines the battery 30 as in a fully charged state when the SOC of the battery 30 is larger than a preconfigured value. Then, the control unit 100 turns off the switch 70 to prevent energy loss due to additional charging of the battery 30 which is fully charged.

The first time interval is a time during which the switch 70 is turned off, and means a time from a time point at which the control unit 100 turns off the switch 70 when an SOC of the battery 30 is larger than a preconfigured value, to a time point at which the control unit 100 turns on the switch 70 again before the vehicle arrives at a destination.

The first time interval may be derived by using equation 1 below. In equation 1, T generally indicates an estimated destination arrival time calculated when a user inputs a destination to the navigation device 90. However, an estimated destination arrival time for deriving a first and a second time interval according to the present invention may be a time from a time point of turning off the switch 70, to a time point of arrival. That is, an estimated destination arrival time may refer to a time from a time point at which the switch 70 is turned off when an SOC of the battery 30 reaches a preconfigured value after the battery 30 is charged by the switch 70 turned on at the time of the vehicle starting, to a time point of arrival.

For example, when an estimated destination arrival time calculated for a destination input to the navigation device 90 is 60 minutes and 20 minutes is required until an SOC of the battery 30 reaches a preconfigured value after the switch 70 is turned on at the time of the vehicle starting, an estimated destination arrival time for deriving a first and a second time interval is calculated as 40 minutes by subtracting 20 minutes from 60 minutes. Pchg indicates a charging power, corresponding to output power of the DC-DC converter 50. Pdiff indicates a discharging power, corresponding to power loss for a predetermined time after the switch 70 is turned off and the output power of the DC-DC converter 50 is maintained, the power loss being measured through a sensor connected to the battery 30. Further, Pdiff may be derived through an average value measured for a predetermined time from a time point at which the switch 70 is turned off. Pload indicates a load power, corresponding to power consumed by a load.

$$\text{first time interval} = T^*(Pchg-2Pdiff-Pload)/(Pchg-Pdiff-Pload) \quad \text{[Equation 1]}$$

In equation 1, T indicates an estimated destination arrival time, Pchg indicates a charging power, Pdiff indicates a discharging power, and Pload indicates a load power.

A second time interval means a time from a time point at which the switch 70 is turned on again before the vehicle arrives at the destination, to a time point of arrival at the destination. The battery 30 is charged during the second time interval to be in a fully charged state when the vehicle arrives at the destination. Therefore, the battery 30 can be prevented from being discharged when the vehicle stops, so that durability degradation due to discharging of the battery 30 can be prevented. Further, the battery 30 is fully charged in advance before the vehicle arrives, and thus has an improved charging efficiency in comparison with charging of the battery 30 during stopping of the vehicle.

The second time interval may be derived by difference between the derived estimated destination arrival time T and the first time interval. Particularly, the second time interval may be derived by using equation 2 below. In equation 2, T, Pchg, Pdiff, and Pload are respectively identical to T, Pchg, Pdiff, and Pload, in the aforementioned equation 1 for deriving the first time interval.

$$\text{second time interval} = T^*(Pdiff)/(Pchg-Pdiff-Pload) \quad \text{[Equation 2]}$$

In equation 2, T indicates an estimated destination arrival time, Pchg indicates a charging power, Pdiff indicates a discharging power, and Pload indicates a load power.

The control unit 100 turns off the switch 70 for a first time interval when an SOC of the battery 30 is larger than a preconfigured value, and adjusts output voltage of the DC-DC converter 50 according to the magnitude of the electrical load 110.

The control unit 100 turns off the switch 70 when an SOC of the battery 30 is larger than a preconfigured value, thereby preventing energy loss due to additional charging of the battery 30 which is fully charged. At the same time, the control unit 100 adjusts output voltage of the DC-DC converter 50 according to the magnitude of the electrical load 110, thereby improving the fuel economy of the vehicle.

The specific control operation of the control unit 100 will be described through the following battery charging control method.

Referring to FIGS. 2 and 3, a battery charging control method according to an embodiment of the present invention, may include the operations of: when a navigation device receives a destination and a vehicle starts, turning on a switch to charge a battery (S100 and S200); when a State Of Charge (SOC) of the battery becomes larger than a preconfigured value (X), turning off the switch during a first time interval (interval C) derived on the basis of an estimated destination arrival time (interval T') transmitted from the navigation device (S300 and S400); and turning on the switch again at a time point (2') at which the first time interval (interval C) has passed, to charge the battery during a second time interval (interval D) (S700).

In the operations of charging of the battery (S100 and S200), first, a user inputs a destination to the navigation device so as to calculate an estimated destination arrival time. Then, when the vehicle starts, the switch is turned on so as to charge the battery. The battery is charged until having an SOC of a preconfigured value (X) (interval A). The preconfigured value (X) is a preconfigured State Of Charge (SOC) as described above, may be 80-90% in an embodiment of the present invention, and may vary according to the setting. A battery SOC reaching a preconfigured value (X) may mean the battery is fully charged.

Like the battery charging control system as described above, the estimated destination arrival time is generally an estimated destination arrival time (interval T) calculated when a user inputs a destination to the navigation device. However, an estimated destination arrival time (interval T') for deriving a first and a second time interval according to the present invention may be a time from a time point (1') at which the switch is turned off, to a time point (3') of arrival. That is, the estimated destination arrival time (interval T') may be a time from a time point (1') at which the switch is turned off when an SOC of the battery reaches a preconfigured value after the battery is charged by the switch turned on at the time of the vehicle starting, to a time point (3') of arrival.

In the operations of turning off the switch for the first time interval (S300 and S400), the switch is turned off when the SOC of the battery becomes larger than a preconfigured value (X). Therefore, turning off the switch when the battery is fully charged can fundamentally block energy loss due to charging of the fully charged battery. When the switch is turned off, the electrical load receives electric power supplied from the DC-DC converter instead of the battery, and the output voltage of the DC-DC converter is adjusted according to the magnitude of the electrical load, so that the fuel economy of the vehicle can be improved.

After the switch is turned off, the discharging power of the battery is measured for a predetermined time (interval B, which may vary according to the setting). That is, the discharging power is measured as an average value measured for a predetermined time from a time point at which the switch 70 is turned off (S500). Then, on the basis of the measured discharging power and an estimated destination arrival time (interval T') from a time point (1') of turning off the switch, to a time point (3') of arrival, the first time interval (interval C) during which the switch is turned off, and the second time interval (interval D) from a time point (2') of turning on the switch again before the vehicle arrives at the destination, to a time point (3') of arrival at the destination are derived (S600). The first time interval (interval C) and the second time interval (interval D) are derived by using equations below.

first time interval (interval $C$)=$T^*(Pchg-2Pdiff-Pload)/(Pchg-Pdiff-Pload)$ second time interval (interval $D$)=$T^*(Pdiff)/(Pchg-Pdiff-Pload)$ In the equations, T indicates an estimated destination arrival time, Pchg indicates a charging power, Pdiff indicates a discharging power, and Pload indicates a load power.

T, Pchg, Pdiff, and Pload are respectively identical to T, Pchg, Pdiff, and Pload, in the equation 1 for deriving the first time interval (interval C) as described above in the battery charging control system.

As understood from the derived equations, the first time interval (interval C) during which the switch is turned off and the second time interval (interval D) during which the switch is turned on before the vehicle arrives at the destination may vary on the basis of an estimated destination arrival time. Therefore, the present invention allows a switch to be turned on before the vehicle arrives at the destination, so as to charge the battery while ensuring the battery is fully charged when the vehicle arrives.

After the first time interval (interval C) and the second time interval (interval D) are derived, the switch is turned off for the derived first time interval (interval C). In the first time interval, the battery is hardly affected from the electrical load, because the switch is turned off, and thus has a small variation width until the vehicle arrives.

In the operation of charging the battery for the second time interval (interval D) (S700), the switch is turned on again at a time point (2') at which the first time interval (interval C) has passed (S700), so as to charge the battery for the second time interval (interval D). Accordingly, the battery is fully charged until the vehicle arrives at the destination, so as to prevent the battery from being discharged when the vehicle stops, and further block the durability degradation due to battery discharging. Also, the battery is fully charged in advance before the vehicle arrives, and thus can have an improved charging efficiency in comparison with charging of the battery during stopping of the vehicle.

As described above, a battery charging control method and system according to various embodiments of the present invention, uses navigation information to determine a time point at which a vehicle stops running; and when the vehicle stops running, controls an auxiliary battery to be as fully charged as possible so as to prevent the battery from being discharged and prevent energy from flowing to the auxiliary battery when the auxiliary battery is fully charged, thereby maximizing fuel economy.

Also, the method and the system minimize consumption power of an LDC thereby minimizing the energy consumption of a main battery.

Also, the method and the system fully charge an auxiliary battery, then turn off a switch of the auxiliary battery, and allow a voltage of an electrical load to be variably controlled by a LDC, thereby improving fuel economy.

Also, the method and the system can maximally use a variable voltage control for an LDC by including a travelling time increase due to a traffic state through calculation on the basis of time.

Also, the method and the system maximally maintain a conventional variable voltage control through fully-charging control at an arrival point and maintenance of a charging limit line, so as to maintain the effect of fuel economy.

Also, the method and the system perform a fast fully-charging control, instead of increasing in a charging lower limit line, so as to minimize fuel economy loss due to overcharging of an SOC.

Also, even if an electrical load is rapidly changed at the vicinity of an arrival point, the electrical load is not affected therefrom because a relay is turned off after an auxiliary battery is fully charged. Therefore, it is possible to make an auxiliary battery be in a fully charged state upon arrival.

A particular embodiment of the present disclosure has been illustrated and described, but various changes and modifications would be obvious to a person ordinarily skilled in the art without departing from the technical idea of the present disclosure, provided by the following claims.

What is claimed is:

1. A battery charging control method comprising:
   turning on a switch connected between a DC-DC converter and a battery when a vehicle is turned on;
   when a State Of Charge (SOC) of the battery is larger than a preconfigured value, turning off the switch for a first time interval derived based on an estimated destination arrival time; and
   turning on the switch again at a time point at which the first time interval has passed, the switch being turned on again to charge the battery for a second time interval.

2. The method of claim 1, further comprising deriving the estimated destination arrival time from information received from a navigation device.

3. The method of claim 1, wherein turning off of the switch comprises turning off the switch and adjusting an output voltage of the DC-DC converter according to a magnitude of an electrical load electrically connected, together with the battery, in parallel to an output terminal of the DC-DC converter.

4. The method of claim 3, wherein the estimated destination arrival time is a time duration from a time point of turning off the switch to a time point of arrival.

5. The method of claim 4, wherein the first time interval is derived with an equation, $$\text{first time interval} = T^*(P_{chg} - 2P_{diff} - P_{load})/(P_{chg} - P_{diff} - P_{load}),$$

wherein T indicates the estimated destination arrival time, $P_{chg}$ indicates a charging power, $P_{diff}$ indicates a discharging power, and $P_{load}$ indicates a load power.

6. The method of claim 5, wherein the second time interval is derived with an equation, $$\text{second time interval} = T^*(P_{diff})/(P_{chg} - P_{diff} - P_{load}).$$

7. The method of claim 1, wherein the estimated destination arrival time is a time duration from a time point of turning off the switch to a time point of arrival.

8. The method of claim 7, wherein the first time interval is derived with an equation, $$\text{first time interval} = T^*(P_{chg} - 2P_{diff} - P_{load})/(P_{chg} - P_{diff} - P_{load}),$$

wherein T indicates the estimated destination arrival time, $P_{chg}$ indicates a charging power, $P_{diff}$ indicates a discharging power, and $P_{load}$ indicates a load power.

9. The method of claim 8, wherein the second time interval is derived with an equation, $$\text{second time interval} = T^*(P_{diff})/(P_{chg} - P_{diff} - P_{load}).$$

10. The method of claim 1, wherein the first time interval decreases as a discharging power increases;

wherein the discharging power corresponds to power loss for a predetermined time after the switch is turned off and an output power of the DC-DC converter is maintained;

wherein the power loss is measured through a sensor connected to the battery; and wherein the discharging power is derived through an average value measured for the predetermined time from a time point at which the switch is turned off.

* * * * *